Sept. 9, 1958  R. DI PASQUALE ET AL  2,851,509
ELECTRODE ASSEMBLY FOR ELECTRIC BATTERIES
Filed Nov. 5, 1954

RENATO DI PASQUALE
CHARLES M. GOLD
INVENTORS

BY

AGENT

2,851,509
ELECTRODE ASSEMBLY FOR ELECTRIC BATTERIES

Renato Di Pasquale, Jersey City, N. J., and Charles M. Gold, Franklin Square, N. Y., assignors, by mesne assignments, to Yardney International Corp., New York, N. Y., a corporation of New York Application November 5, 1954, Serial No. 467,076

5 Claims. (Cl. 136—6)

Our invention relates to an electrode assembly for electric batteries (rechargeable or other) and, in particular, for batteries of the type wherein a set of positive and negative plates are applied under pressure against interposed layers of separator material.

In such batteries the problem sometimes arises of providing enough space around the plates to insure adequate irrigation of both negative and positive electrodes at all times. Solutions hitherto proposed include the insertion of fluted or corrugated spacers adjacent the electrode plates and/or the surrounding of these plates with electrolyte-permeated layers of bibulous material. The first-mentioned expedient tends to increase the bulk of the assembly and also its weight, often beyond tolerable limits; and the bibulous layers employed to-date were only partially effective in view of the practice to envelope them, along with the associated electrodes, in wrappers of semi-permeable separator material which isolated these layers from the bulk of the free electrolyte present in the battery casing.

The present invention has for its object the provision of a process for so arranging the elements of an electrode assembly as to provide a capillary path between the interior of the battery casing and each electrode or, at least, those electrodes which are enveloped by semi-permeable wrappers; the invention also has for its object the provision of an assembly produced by this process in which the capillary path gives each electrode access to the body of free liquid within the casing while preventing the harmful migration of particles of active material between the electrodes.

In accordance with our invention, a strip of absorbent paper or similar bibulous, non-conducting material is placed alongside a sheet of semi-permeable separator material, e. g. a film of regenerated cellulose, whereupon the two layers are folded to form one or more electrode compartments whose inner lining is represented by the bibulous strip; this strip is caused to project beyond the semi-permeable sheet on at least one side of the compartment or chain of compartments formed thereby, the projecting end of the strip thus serving as a means for picking up free liquid from the exterior of said compartments and conducting it toward the electrodes therewithin by capillary action. The bibulous strip may, accordingly, be regarded as a wick extending from an electrolyte reservoir (the interior of the battery casing) into each electrode compartment, this wick being held under pressure together with the other elements of the assembly of which it forms a part.

The invention will be better understood from the following detailed description, reference being had to the accompanying drawing in which.

Figure 1:
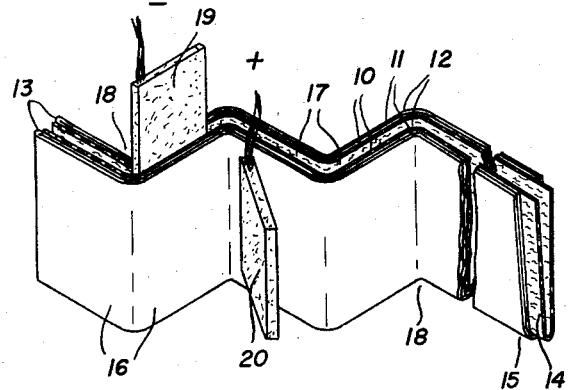
Fig. 1 is a perspective view of an accordion-wrapped electrode assembly (partly completed) embodying the invention.

In Fig. 1 we have shown a strip 10 of absorbent paper and two layers 11, 12 of cellophane (regenerated cellulose), the latter two being shown to form part of a single sheet folded over at the rear edge 13. The three layers 10, 11, 12 are substantially coextensive, except that strip 10 projects beyond the others at the forward end 14, and have been creased in the center to form a closed bottom edge 15. The resulting wrapper, whose innermost layer is the strip 10, is an envelope open at the top and has been accordion-pleated to form several sections 16, each section defining an electrode compartment 17 and each pair of adjoining sections 16 comprising a U-shaped portion of the envelope. Other electrode compartments 18 are formed in the folds between adjacent sections 16.

Figure 2:
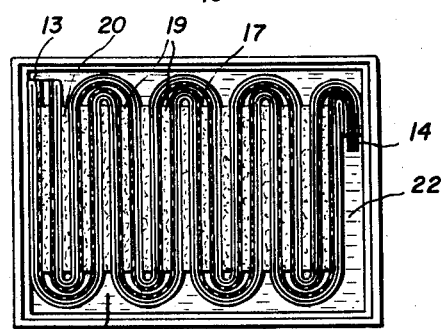
Fig. 2 is a top plan view of a battery casing incorporating the assembly of Fig. 1.

Electrodes of one polarity, e. g. negative plates 19 containing zinc as an active material, are inserted in each electrode compartment 17 and are substantially entirely surrounded by the semi-permeable separator layers 11, 12 forming these compartments. Electrodes of the other polarity, e. g. positive plates 20 containing silver as an active material, are placed in each electrode compartment 18 which is open toward the sides of battery casing 21 (Fig. 2). Thus, it will be seen that the body of free electrolyte 22 present in casing 21, which may be a zinc-saturated solution of potassium hydroxide, has ready access to the electrodes 20 in compartments 18 and is also admitted to the electrodes 19 in compartments 17 by the capillary action of the wick 10.

Figure 3:
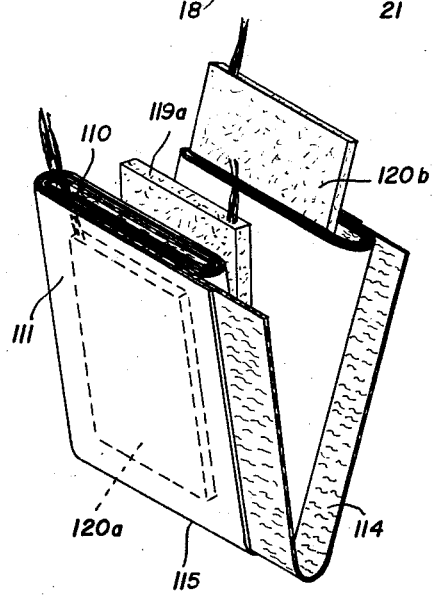
Fig. 3 is a perspective view of a U-shaped electrode assembly embodying the invention.

In Fig. 3 we have shown part of an electrode assembly in which a paper strip 110 and a similar cellophane strip 111 have been wrapped several times around a pair of, for example, positive plates 120a, 120b, the latter plate having been illustrated in partly withdrawn position for the sake of clarity. The innermost layer of the flat, sleeve-like envelope so formed is again part of the bibulous strip 110, the latter projecting at 114 beyond the semi-permeable separator strip 111. The envelope has been folded along a median line 115 to form a U with upstanding arms. An electrode plate 119a of opposite (here negative) polarity is inserted between the arms of the U.

Figure 4:
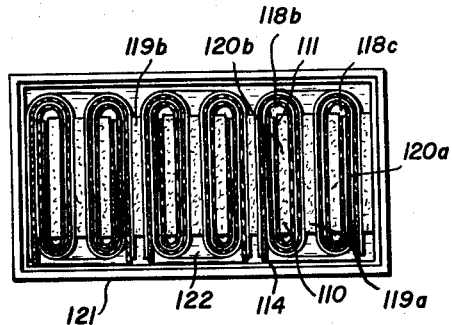
Fig. 4 is a top plan view of a battery casing incorporating several assemblies according to Fig. 3.

In Fig. 4 a casing 121, containing a body of free liquid electrolyte 122, is filled with a plurality of U-shaped assemblies of the type shown in Fig. 3, the battery thus formed also including additional negative electrodes 119b inserted between successive assemblies and also between the extreme right-hand U and the casing wall. Again, as in the preceding embodiment, the bibulous layer 110 acts as a wick to supply the electrodes within the compartments 118a, 118b formed in each arm of a U, in this case the positive plates 120a, 120b. The negative plates 119a, 119b are directly accessible to the electrolyte and do not require any wicking action.

It will be noted that the projecting portion 14 or 114 of the bibulous strip 10 or 110 extends into the liquid-filled part of the casing 22 or 121, respectively, so as always to draw on an adequate supply of electrolyte for proper irrigation of the compartments 17 or 118a, 118b. It may be mentioned in this connection that whereas in Fig. 4 the wick ends 114 have all been shown extending in the same direction, it will be possible to reverse one or more U's so that these ends will project partly into one and partly into the other of the two electrolyte compartments present within container 121.

Our invention is, of course, not limited to the specific embodiments described and illustrated but may be realized in a variety of adaptations and modifications without departing from the spirit and scope of the appended claims. Thus it may be mentioned that whereas the invention has been found particularly useful in conjunction with alkaline electrolytes, its utility is not restricted to systems using electrolytes of this type.

We claim:

1. In an electric battery, in combination, a casing containing a body of free liquid electrolyte and an electrode assembly in said casing, said assembly comprising a semi-permeable sheet folded along a horizontal line and defining two upstanding substantially equal portions, said portions being horizontally folded in zig-zag fashion and forming a plurality of first compartments between said portions and at least one second compartment intermediate said first compartments, an electrode plate of one polarity in each of said first compartments and an electrode plate of opposite polarity in said second compartment, said electrolyte having free access to said electrode plate of opposite polarity.

2. The combination according to claim 1, further comprising a strip of bibulous material lining each of said first compartments and extending outwardly beyond a vertical edge of said sheet into said body of electrolyte, said strip being in contact with said electrode of one polarity.

3. In an electric battery, in combination, a casing, an electrode assembly in said casing, said casing forming an electrolyte compartment alongside said assembly and a body of free liquid electrolyte in said compartment; said assembly comprising an envelope formed of semi-permeable sheet material defining at least one electrode compartment substantially closed against said electrolyte compartment and at least one other electrode compartment open toward said electrolyte compartment, a strip of bibulous material lining said one electrode compartment and extending outwardly beyond said sheet into said electrolyte compartment, a first electrode of one polarity positioned in said one electrode compartment in contact with said strip, and a second electrode of opposite polarity positioned in said other electrode compartment.

4. The combination according to claim 3, wherein said electrolyte is an alkaline solution, said electrodes containing zinc and silver, respectively, said semi-permeable sheet material being regenerated cellulose.

5. The combination according to claim 3, wherein said assembly is held under pressure in said casing.

References Cited in the file of this patent

UNITED STATES PATENTS

| | | |
|---|---|---|
| 718,205 | Hutchison | Jan. 13, 1903 |
| 1,548,539 | Martus et al. | Aug. 4, 1925 |
| 2,050,173 | Gordon | Aug. 4, 1936 |
| 2,610,219 | Yardney | Sept. 9, 1952 |
| 2,635,127 | Yardney et al. | Apr. 14, 1953 |
| 2,701,271 | Mautner et al. | Feb. 1, 1955 |
| 2,719,874 | Chapman | Oct. 4, 1955 |
| 2,739,179 | Barrett | Mar. 20, 1956 |